US008238816B2

(12) United States Patent
Kiesling (10) Patent No.: US 8,238,816 B2
(45) Date of Patent: Aug. 7, 2012

(54) SATELLITES AND SIGNAL DISTRIBUTION METHODS AND OFF-SET PATTERN FOR SENDING SIGNALS

(75) Inventor: John D. Kiesling, Berwyn, PA (US)

(73) Assignee: Spectrum Five LLC, Washington, DC (US)

( * ) Notice: Subject to any disclaimer, the term of this patent is extended or adjusted under 35 U.S.C. 154(b) by 734 days.

(21) Appl. No.: 11/246,288

(22) Filed: Oct. 11, 2005

(65) Prior Publication Data

US 2007/0082609 A1  Apr. 12, 2007

(51) Int. Cl.
*H04B 7/185* (2006.01)

(52) U.S. Cl. ...... 455/12.1; 455/13.3; 455/428; 455/429; 455/443; 370/316; 370/323

(58) Field of Classification Search ............... 455/12.1, 455/13.2, 13.3, 427–429, 444, 449, 446, 455/443, 20, 101; 370/335, 316, 323, 322, 370/324
See application file for complete search history.

(56) References Cited

U.S. PATENT DOCUMENTS

| 5,995,495 | A | 11/1999 | Sampson |
| 6,173,178 | B1 | 1/2001 | Hammill et al. |
| 6,331,870 | B1 | 12/2001 | LeCompte |
| 6,356,539 | B1 | 3/2002 | Zuliani |
| 6,512,485 | B2 | 1/2003 | Luly |
| 6,708,029 | B2 | 3/2004 | Wesel |
| 6,778,810 | B1 | 8/2004 | Anderson |
| 6,813,492 | B1 * | 11/2004 | Hammill et al. ............... 455/429 |
| 2001/0018327 | A1 * | 8/2001 | Houston et al. ............... 455/13.2 |
| 2001/0036826 | A1 | 11/2001 | Norin |
| 2002/0068526 | A1 * | 6/2002 | Butte et al. ................... 455/13.1 |
| 2002/0085643 | A1 * | 7/2002 | Kitchener et al. ............ 375/267 |
| 2003/0203718 | A1 * | 10/2003 | Wiswell ....................... 455/13.3 |
| 2004/0102156 | A1 * | 5/2004 | Loner ........................... 455/12.1 |
| 2004/0166801 | A1 | 8/2004 | Sharon |
| 2004/0242150 | A1 | 12/2004 | Wright |
| 2004/0244036 | A1 | 12/2004 | Wright |

FOREIGN PATENT DOCUMENTS

EP  0721259  7/1996

(Continued)

OTHER PUBLICATIONS

Abstract: Brandes, R.D. et al., "the impact of expanded communication services on satellite system design" American Institute of Aeronaut, Astronautics and Canada Aeronautics and Space Institute; Conference Apr. 5-8, 1976.

(Continued)

*Primary Examiner* — Sujatha Sharma
(74) *Attorney, Agent, or Firm* — Wiley Rein LLP (57) ABSTRACT

The invention relates to methods, systems, and satellites that employ an off-set pattern of spot-beams to transmit signals or television signals over a desired area of the earth. In one example, a heavily populated metropolitan area in the continental United States is covered by at least two patterns of spot-beams, where the patterns are off-set to one another by a lateral or translational displacement, rotation, or both. The off-set patterns can be used in conjunction with existing satellites and systems and incorporated into new satellites and systems. The methods reduce problems associated with the straddling of subscriber areas caused by local-into-local requirements, and advantageously allow increased spot-beam capacity, and the reduction in earth uplink stations.

16 Claims, 5 Drawing Sheets

| FOREIGN PATENT DOCUMENTS | | | |
|---|---|---|---|
| EP | 0910180 | | 4/1999 |
| EP | 1223691 | | 7/2002 |
| EP | 1353454 A2 | * | 10/2003 |
| EP | 1126543 | | 8/2006 |
| JP | 2001251137 | * | 9/2001 |
| WO | WO2004/103325 | | 12/2004 |

OTHER PUBLICATIONS

International Search Report and Written Opinion for PCT/US2006/039145.

International Preliminary Examination Report for PCT/US06/39145 filed Oct. 6, 2006, dated Oct. 27, 2008.

* cited by examiner

SATELLITES AND SIGNAL DISTRIBUTION METHODS AND OFF-SET PATTERN FOR SENDING SIGNALS

FIELD OF INVENTION

The invention concerns the use of geostationary satellite communications with multiple spot-beam satellite antennas serving a multitude of ground-based subscribers. Methods and satellite systems are described that substantially improve the satellite transmission efficiency, increasing the transmission data rate and reducing the cost of satellite transmission.

BACKGROUND OF INVENTION

There are a variety of systems and proposals for satellite television and data broadcasting or broadcasting over defined geographic or customer service areas. One proposal employs multiple spot-beam patterns to essentially cover an entire service area. However, there are requirements that complicate the operation of multiple spot-beam systems. One example is the "local-into-local" service, where the satellite operator must collect television broadcast signals from a specific television market area, called a "designated market area" or DMA (as defined by Nielsen Media Research Corp.), uplink these signals to the satellite via an uplink earth station, and then re-transmit these signals only to the subscribers within the original DMA and to no others. There are approximately 215 DMAs in the U.S., corresponding to approximately 1600 television signals. While the area of DMAs generally follow county lines, they are irregular in shape and vary in size. Since the spot-beams are nearly circular or oval in shape and limited in area, covering specific DMAs can become costly and require duplication in signal transmission because any one DMA may not be contained within a single spot-beam. That is, a spot-beam may contain one or more DMAs but it also may contain only parts of one or more DMAs, the remainder of the DMAs lying in adjacent beams. Thus, one or more DMAs may "straddle" two or more spot-beams. To serve a straddled DMA, the same TV signals must be transmitted in both spot-beams, decreasing the efficiency of the satellite and increasing its cost of operation.

A further complication may arise for an individual spot-beam serving DMAs containing many TV signals, such as heavily populated service areas surrounding New York City, which service area contains many DMAs and many TV signals. Because the high demand for TV signals from DMAs in this, and similar, service areas may exceed the spot-beam capacity, i.e., this spot-beam may "saturate," either some DMAs must be omitted from the service or the data rate of the service must be reduced, limiting the utility of the service. Typically, the data rate for the service, i.e., the data rate per TV channel, must be limited to the value that meets the demand in the highest capacity spot-beam (such as serves the New York City service area). Spot-beams for other service areas, such as the vicinities of Chicago, Atlanta, or Los Angeles, may also saturate for the same reasons.

Accordingly, improvements in the design of satellite communications systems, antennas, and methods and systems for distributing spot-beams to cover a geographic area are desired in the art.

SUMMARY OF THE INVENTION

The following is a brief summary of selected aspects and attributes of the invention and should not be considered as the complete description of the invention. The invention as a whole encompasses all the subject matter of this document, all the drawings and claims, as well as equivalents and comparable embodiments and improvements one of skill in the art could devise from the combined contents.

Figure 1:
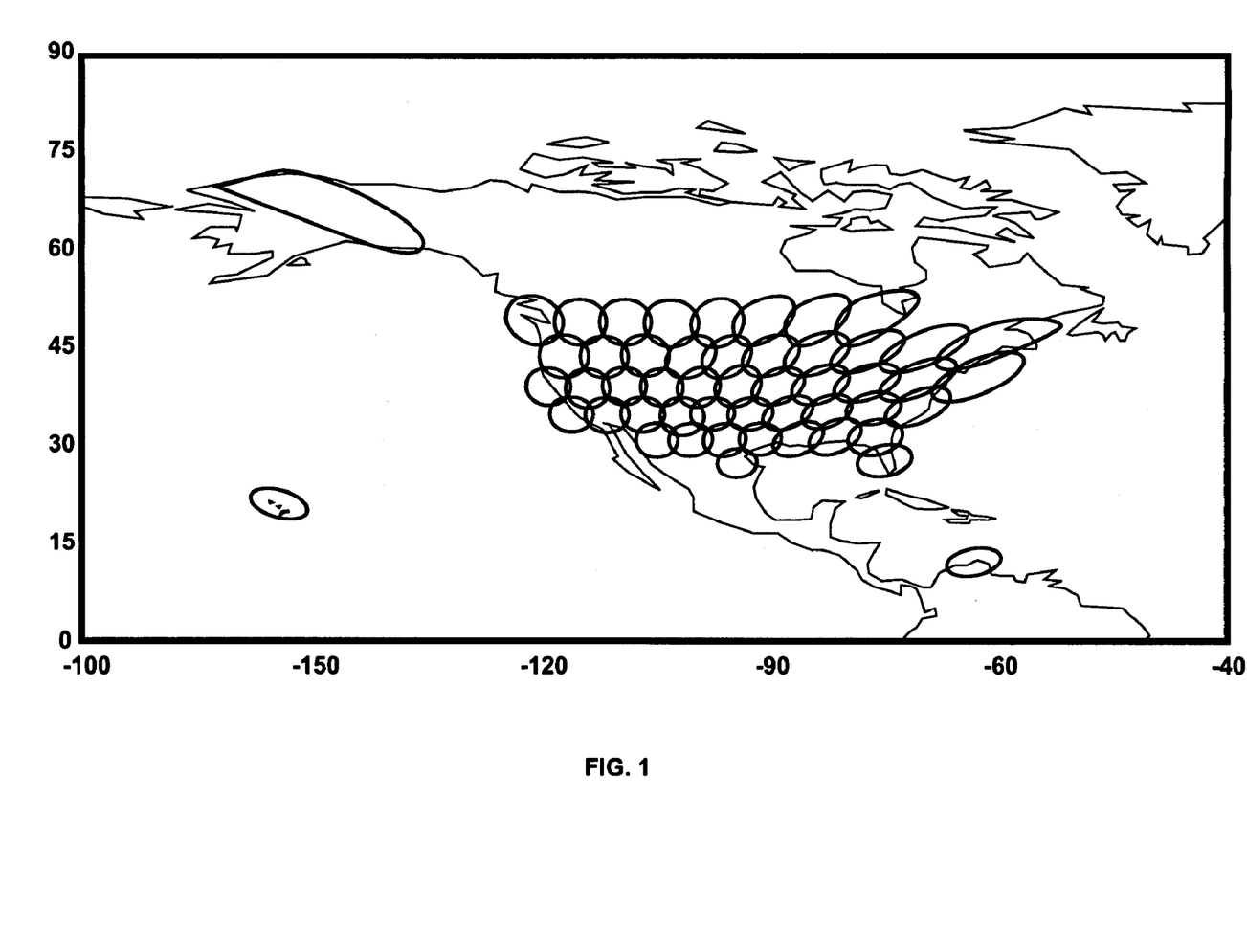
FIG. 1 depicts a typical spot-beam coverage pattern on one polarization from a single satellite, or multiple satellites, over the continental U.S. Each circle represents the coverage area of a single spot-beam. The capacity is doubled if the same spot-beam coverage pattern is provided on the orthogonal polarization. The antennas generating the two orthogonally polarized patterns may be on one or more satellites.

In one aspect, the invention encompasses the use of multiple spot-beam or multi-beam antennas that are commonly used in satellite communications, whereby the service area to be served, such as the 48 states or continental U.S. (CONUS), is completely covered by the multiple spot-beam pattern, leaving no coverage gaps outside the spot-beams as, depicted by the example of FIG. 1. The invention specifically includes a satellite or a constellation of satellites to form the spot-beams, methods of configuring and methods of commanding the satellites to form the special spot-beam patterns, and communication networks or television distribution networks that use the satellites or constellation of satellites or the methods. For the methods and satellites used, any beamwidth may be selected for the pattern, called the coverage beamwidth and the coverage beamwidth may not necessarily be the half power beamwidth as commonly defined for other antennas, but may be the beamwidth corresponding to the −4 dB level or any other level relative to the peak. Typically, a level of approximately −4 dB is chosen because this is close to the level providing maximum gain over a spot-beam service-area.

In a preferred embodiment, frequencies may be assigned to each spot-beam such that co-frequency, co-polarized beams are separated by approximately a beamwidth so that co-frequency beam interference is at acceptable levels. Typically, one third, one fourth, one seventh, etc., of the available frequency band may be assigned to each beam in order to achieve an acceptable level of interference. While only part of the frequency allocation may be available in each beam, the total bandwidth generated by the overall pattern can be very large since the number of beams can be very large, i.e., tens or even hundreds of beams. If the available bandwidth is 500 MHz, and one fourth of this allocation is assigned to each beam in a 48 beam configuration then the total bandwidth generated by the spot-beam configuration is 500/4×48=6,000 MHz. Thus, the expansion of the useful bandwidth via spot-beams can be large. Thus, spot-beams provide the capacity needed to relay the roughly 1,600 TV channels of the local-to-local service and also enable the satellite to concentrate the radiated signals to the vicinity of their destination. FIG. 1 depicts an example of a spot-beam pattern covering CONUS and offshore service areas with 48 spot-beams serving the 48 states of CONUS and three serving offshore areas.

Figure 2:
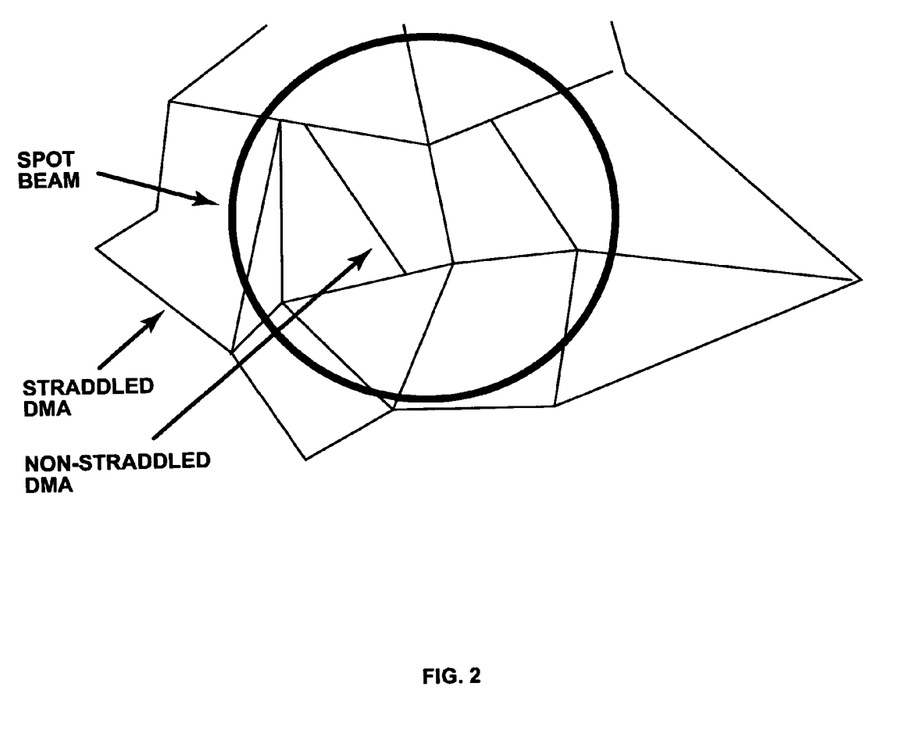
FIG. 2 depicts a single spot-beam covering multiple geographic areas or, for the examples considered herein, designated market areas (DMAs). Some DMAs are wholly within a spot-beam and some DMAs are partially within a spot-beam and "straddle" the spot-beam and a neighboring spot-beam.

The invention also encompasses a method of designing or selecting a spot-beam pattern to distribute signals to geographic areas within each spot-beam. The geographic areas may be a mosaic of DMAs as described herein, or may be other mosaics of geographic areas, such as municipalities, counties, states, or groups of nations. The example of specific interest herein concerns Designated Market Areas or DMAs, designated by Nielsen Media Research Corporation, which are market areas served by television stations. There are 215 DMAs within the U.S. The DMAs are geographical areas of irregular shape and of varying size. Generally, for local-into local TV service, as now required by Congress, a satellite operator can re-transmit these signals through a satellite but must have them received only by subscribers within the DMA which originated those TV signals. The TV signals from DMAs within a spot-beam service area are concentrated at an "uplink" earth station called a feederlink earth station. An example is depicted in FIG. 2, illustrating a single spot-beam illuminating a service area within which are illustrated a number of DMAs of various sizes and shapes. A DMA wholly within the spot-beam would be served exclusively by that spot-beam. However, a DMA may "straddle" two spot beams, as illustrated in FIG. 2, requiring that the TV signals of this DMA be transmitted in a neighboring spot-beam as well. This overlapping of DMAs between beams, called "straddling," reduces the transmission efficiency of the satellite system by increasing the number of times a given TV signal must be transmitted by the satellite, thereby increasing the cost of service. In addition, all of the DMAs within the spot-beam of FIG. 2 (on one or two polarizations) must be carried because there may be no alternative spot-beam illuminating this area.

The invention, however, provides alternative spot-beams which can carry a DMA, thus relieving heavily congested spot-beams. This is referred to as "diffusion." The invention proposes methods for minimizing "straddling" and/or for promoting the "diffusion" of traffic away from saturated spot-beams.

Figure 3:
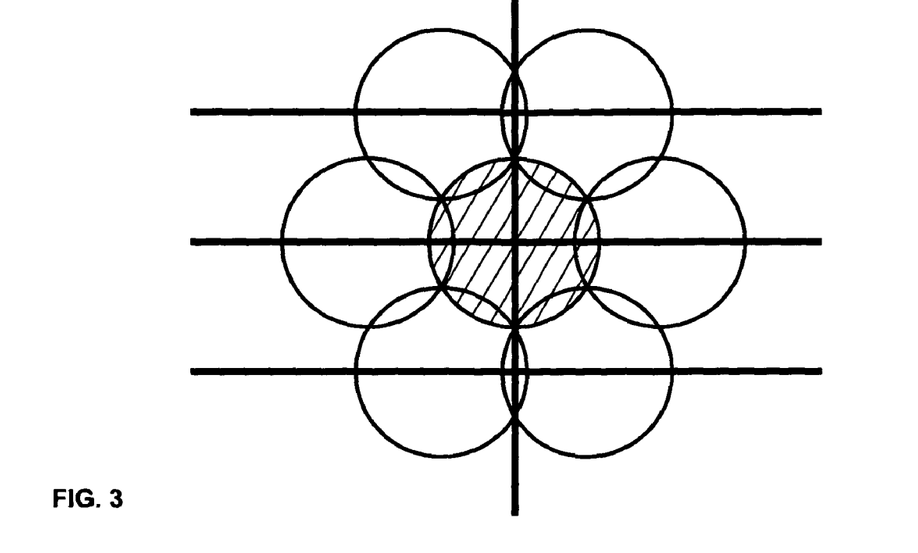

A typical segment of the spot-beam coverage arrangement of FIG. 1 is depicted in FIG. 3 (the other spot-beams are not shown for purposes of clarity) showing a cross-hatched "interior" spot-beam surrounded by 6 other spot-beams. An interior spot-beam is one having six surrounding spot-beams and an exterior spot-beam has less than six surrounding spot-beams. In this example, the six outer spot-beams intersect the central spot-beam every 60 degrees. Intersection locations where three spot-beams intersect are commonly called triple crossover points. This pattern may be repeated in order to extend the pattern in all directions so as to cover any service area, such as the entire CONUS. The pattern also has "exterior" spot-beams at the edge of the coverage area. These exterior spot-beams are surrounded by less than six spot-beams, depending on the irregularity of the coverage area borders. Other spot-beam patterns are possible, for example where certain spot-beams may be left out or where some spot-beams are larger than others.

The use of spot-beam patterns is efficient in serving point-to-point users, such as individual subscribers in satellite based Internet service, called "Broadband," because every subscriber is located somewhere in one of the beams and, consequently, can always receive the appropriate signals. To provide the maximum capacity the same patterns depicted in FIGS. 1 and 3, as discussed above, are provided on the orthogonal polarization, thus doubling the capacity, i.e., each spot-beam is coaxial with the corresponding spot-beam on the orthogonal polarization. In this case, a given DMA may be served by the spot-beam of either polarization.

By utilizing the satellites, satellite constellations, and methods of the invention, a satellite television service can minimize the inefficiencies caused by "straddling" and improve the efficiencies of transmission by promoting "diffusion" and still provide service to the entire CONUS. The invention embodies the creation of two almost identical antenna spot-beam coverage patterns, called Pattern 1 and Pattern 2 such as depicted in the Figures, for example FIGS. 4-5. However, the Pattern 2 is "offset" from Pattern 1, either in translation or in rotation, or both, in order to attain the desired coverage characteristics. Pattern 2 also is orthogonally polarized to Pattern 1. Patterns 1 and 2 might be generated by a single phased array antenna or by one or more reflector-type antennas. The antennas generating the Patterns 1 and 2 may be contained on one satellite or two or more satellites. In the latter case, some orbital redundancy is achieved, providing total coverage but reduced service should one of the satellites fail.

Figure 4:
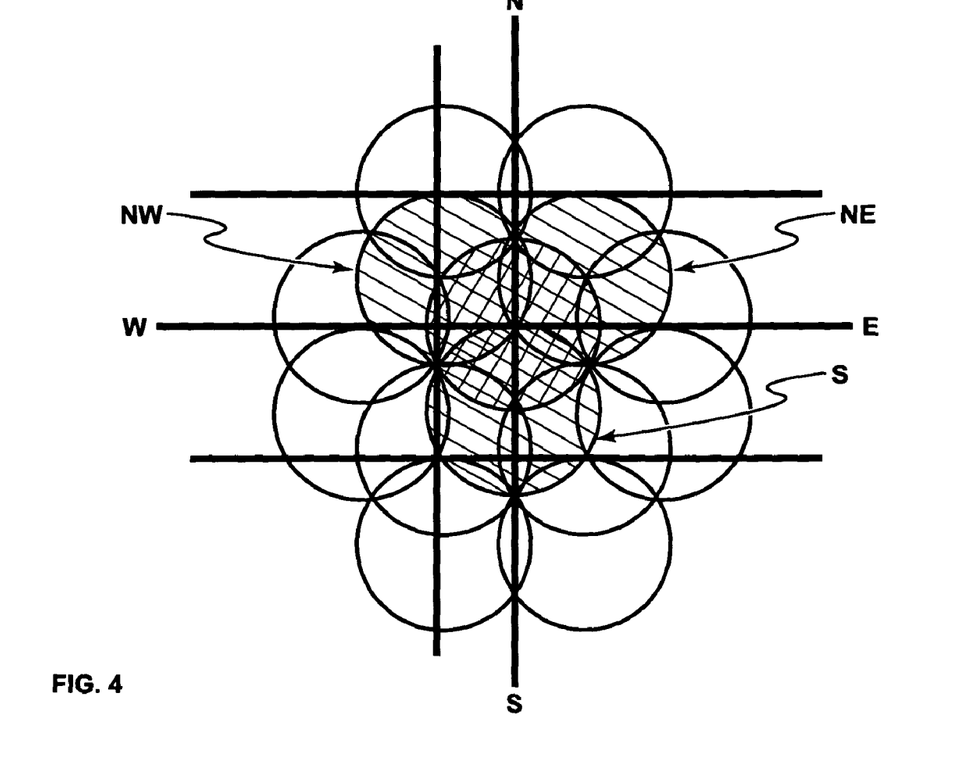
FIG. 4 depicts a portion of a spot-beam pattern showing the original pattern of FIG. 3, called Pattern 1, plus the orthogonal pattern of FIG. 3 but offset, called Pattern 2. The Pattern 2 offset accomplishes the objectives of this invention which is to reduce "straddling" and to promote "diffusion", where needed. Pattern 2 is generated by simple translation in one or two directions, by rotation or by a combination of translation and rotation.

In another aspect of the invention, the problem of straddling and spot-beam saturation is minimized in an antenna system using one or more satellites) with two spot-beam patterns, one on each polarization, to "off-set" the spot-beam pattern of one antenna with respect to the other antenna. The off-set may be any amount in only one direction or in two orthogonal directions, called a translation, in order to obtain the desired composite pattern. Alternatively, Pattern 2 might be rotated relative to Pattern 1 or a combination of translation and rotation of Pattern 2 relative to Pattern 1 might have advantageous characteristics. An example is given in FIGS. 3 and 4, in which the spot-beam pattern of FIG. 3 (and FIG. 1) is shifted slightly south and superimposed on the original, similar pattern. Thus, Pattern 1 remains the same (as in FIGS. 1 and 3) but Pattern 2 is created by shifting the orthogonal pattern of FIGS. 1 and 3 south by a one half-coverage beam-width. The double cross-hatched spot-beam in the center of FIG. 4 is the spot-beam of interest, and is the original central spot beam depicted in FIG. 3. However Pattern 2, on the orthogonal polarization, now provides three spot-beams that each, partially, cover the central spot-beam of interest. These three spot-beams from Pattern 2, arbitrarily labeled NE, NW and S, intersect with a triple crossover in the very center of the spot-beam of interest from Pattern 1. These three spot-beams cover substantial portions of the edge of the spot-beam of interest. Any DMAs straddling the spot-beam of interest in the NE, NW or S directions may be wholly within one of the three spot-beams of Pattern 2. Thus, the effects of "straddling" can be much reduced. The three spot-beams of Pattern 2, NE, NW and S also cover three of the six triple crossovers of the original Pattern 1, also helping to minimize "straddling." This characteristic, the minimization of straddling, is an important capability of the invention and the use of the Offset Pattern described here.

Further, if the spot-beam of interest is heavily loaded with TV signals these may be offloaded into neighboring spot-beams (spot-beams NE, NW and S); this capability is called "diffusion." In the example of FIG. 3, if a DMA is wholly within the spot-beam of interest but is also within the NE, NW or S spot-beams of Pattern 2, that DMA can be transferred to the appropriate spot beam of Pattern 2. Thus, that DMA is removed from the spot-beam of interest in Pattern 1, thereby reducing the capacity of that spot-beam, and moved to a spot-beam of Pattern 2. This characteristic is called "diffusion" and is an import capability of the Offset Pattern.

Figure 5:
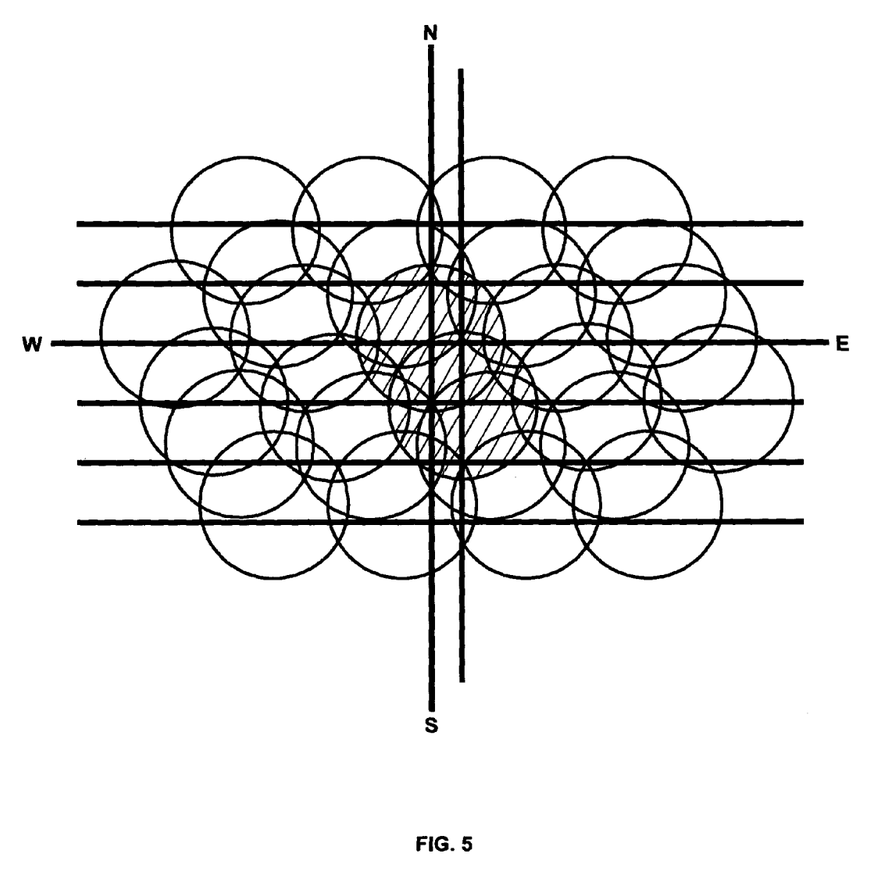
FIG. 5 depicts an Offset Pattern in which Pattern 2 has been translated in two directions. This has the effect, among others, of reducing the number of triple crossover points.

FIG. 5 depicts a case where Pattern 2 was translated in two directions which has the effect of reducing the crossovers. Pattern 2 can also be rotated to achieve a desired effect. The pattern rotation and translation may accomplish many purposes depending on the size, shape, and location of the individual geographic service areas within the spot-beams. The importance and advantages of the invention, in part, derives from the use of and interplay between two or more similar but offset spot-beam patterns.

DESCRIPTION OF THE DRAWINGS

In one aspect, the invention minimizes straddling and/or reduces the capacity of heavily loaded spot-beams via "diffusion."

FIG. 3 depicts an example of a portion of a spot-beam pattern showing an interior spot-beam (hatched) surrounded six other spot-beams. This basic geometry is repeated in order to generate the pattern depicted in FIG. 1. FIG. 3 also depicts the conventional approach to providing spot-beam coverage whereby Pattern 1 and Pattern 2 are identical but orthogonally polarized. In this case any DMA that straddles Pattern 1 also straddles Pattern 2.

DESCRIPTION OF EXEMPLARY EMBODIMENTS

In one aspect of the invention, an arrangement of multiple spot-beam antenna patterns covering the area of interest or part of that area is used to transmit information to the earth. Where television signals are transmitted, typically, there are uplink earth stations that transmit television broadcasting or other signals, via satellite, for re-transmission by the satellite to a particular region or service area via the satellite spot-beams. There may be multiple uplink earth stations, as known in the art, to produce the so-called local-into-local television broadcasts for satellite service. There may also be multiple satellites used within one network or system for transmitting information signals to a region or area, such as the continental United States. While television broadcasts are a preferred embodiment, other information also may be transmitted via satellite using the methods of the invention.

Generation of Spot-Beams and Spot-Beam Capacity/Interference In a preferred embodiment of a television broadcasting satellite and/or method, the spot-beams or multi-beam offset patterns are arranged so that there are no un-served areas, i.e., each service area is illuminated by at least one spot-beam. Each spot-beam can be assigned a frequency band consistent with the amount of frequency re-use desired. In addition, each spot-beam frequency band can be selected based upon or subject to the amount of acceptable self interference from co-channel spot-beams. In another preferred embodiment, the assigned frequency band per spot-beam may be B/3, B/4 etc. OR B/F, where F is the frequency re-use factor and B is the total available bandwidth; the bandwidth available per beam is B/F. As an example, the total bandwidth generated by an exemplary B/4 arrangement in a 500 MHz band for n=48 spot-beams, is 500/4×48=6,000 MHz. Thus, the spot-beam arrangement is capable of generating a large amount of bandwidth out of a small allocation, where the signals to be transmitted via each spot-beam are different. Each receive or transmit spot-beam either receives interference from or causes interference to all the other co-channel spot-beams. The beam separation between co-channel beams must be sufficient to reduce this interference to acceptable levels. Typically, this is accomplished by the use of F=4 segments.

Formation of Offset Patterns

The use of two almost identical, or substantially identical or similar, orthogonally polarized spot-beam patterns, which can be called Pattern 1 and 2, shifted by translation, rotation, or both, one with respect to the other, enables the advantages noted herein, i.e., minimizing straddling and increasing diffusion. The two patterns need not be identical but should be similar enough, or substantially similar, so that reduced straddling or increased diffusion is realized over a designated service area or the total service area. The two or more shifted patterns are called Offset Patterns. The use of Offset Patterns can have significant advantages in minimizing "straddling" and promoting "diffusion."

Straddling

As noted, the use of an Offset Pattern can provide additional choices in assigning geographic areas to the spot-beams, such that "straddling" of geographic areas between spot-beams is minimized, avoiding retransmission of the same signals in both "straddled" spot-beams. For example a DMA straddling the edge of the central spot-beam of FIG. 3 would have to be repeated in the adjacent spot-beam, thus doubling the number of TV signals to be transmitted by the satellite for that DMA. With the offset pattern example depicted in FIG. 4, three spot-beams, labeled NE, NW, and S are available. Since these three available spot-beams cover most of the edge of the central spot-beam, it is likely that the straddled DMA will fit wholly within one or more of these three available spot-beams. In this case, the DMA signals are transmitted in the NE, NW or S spot-beam; straddling is avoided and the DMA TV signals need be transmitted only once.

Diffusion

"Diffusion" refers to reducing the number of TV channels in a spot-beam saturated by TV channels, and can increase the data rate available in the saturated spot-beam, thereby increasing the data rate in the entire network (in this case it is assumed that all subscribers in all of the spot-beams will receive the same quality of service as expressed by data rate). The use of Offset Patterns enable limited capacity satellite systems to provide the full panoply of high definition TV signals, which can be critical to the success of BSS in the marketplace. For example, the use of a Pattern 1 and 2 shifted with respect to one another, by translation or rotation or both, i.e., Offset Patterns, can have significant additional advantages referred to as "diffusion." The capacity of the central spot-beam depicted in FIG. 3, including its co-axial orthogonal spot-beam, carries all the TV channels of all the DMAs within that beam plus all of the TV channels of DMAs straddling this spot-beam and its adjacent six spot-beams. However, with the offset pattern depicted in FIG. 4, some of the traffic can be off-loaded to the NE, NW, and S spot-beams, thereby reducing the capacity of the original central spot-beam. This process is available for any spot-beam that is saturated or otherwise limits the overall data rate. This is called diffusion because some of the TV signals can be off-loaded to overlapping spot-beams serving adjacent or overlapping service-areas. In the case of local-into-local re-transmission of TV signals, the aspect of diffusion afforded by the invention enables a reduction in demand in the spot-beams with the highest demand so that the data rate per TV channel can be increased.

Triple Crossover Points

Also, an Offset Pattern formed by translation, rotation, or both also may minimize triple crossover points, or locations where three spot-beams intersect. Triple crossover points can be seen in the FIGS. 3,4, and 5. A geographic area located under a triple crossover point, depending on the extent of the geographic area, may result in the straddling of three spot-beams, requiring the transmission of the geographic area's signals in all three spot-beams. Offset patterns minimize this effect by covering certain triple crossover points or by providing alternative spot-beams.

In addition, the use of two or more substantially identical spot-beam patterns, such as the Offset Pattern of Pattern 1 and 2 described above, can have significant advantages for the use of uplink earth stations transmitting the TV signals to the satellite or satellites. The Offset Pattern can be arranged to have sextuple crossover points, which are two superimposed triple crossover points. FIG. 4 contains sextuple crossover points. When an uplink earth station is located at a sextuple crossover point, it can transmit signals to up to six spot-beams simultaneously. This may result in a great saving in the number and hence cost of operating the uplink earth stations.

As a particular example of how to use the satellites and systems and methods of the invention, if there are 48 spot-beams, only 8 uplink earth stations would be required if uplink earth stations are located at sextuple crossover points. As a practical matter, fewer beams would be accessed for crossover points near the exterior of the spot-beam pattern, i.e., more than 8 uplink earth stations would be required.

Satellite Network

Figure 6:
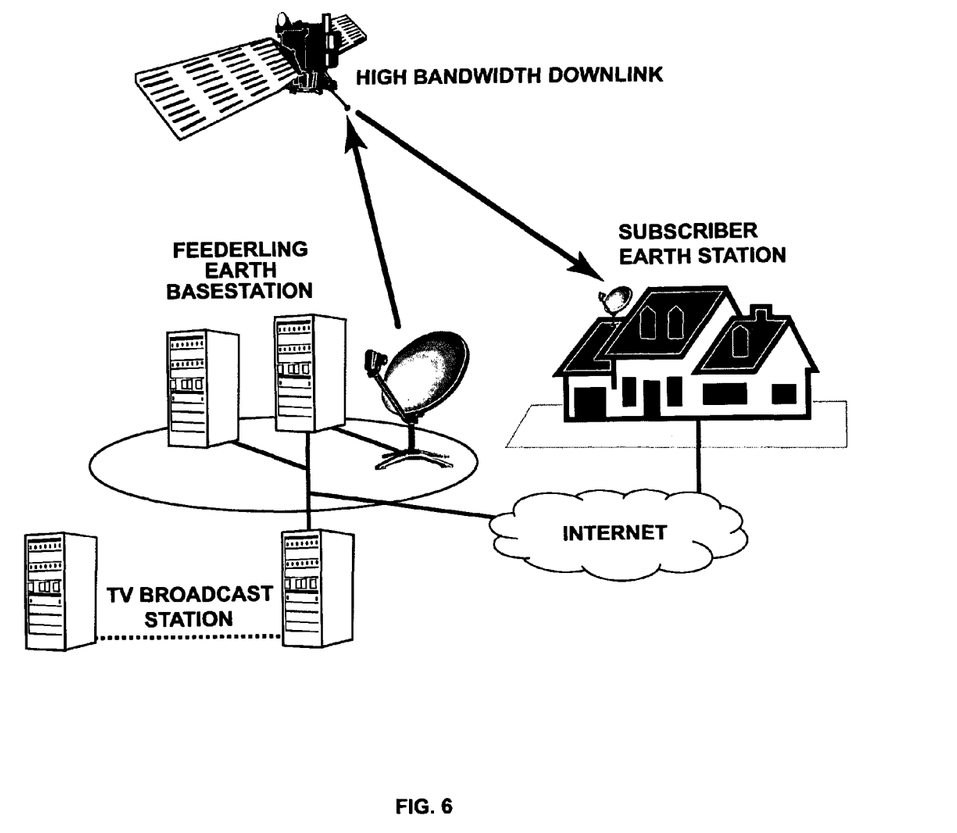
FIG. 6 depicts an exemplary satellite system or communication network for using data transferred via satellite for television or for other data communications. For example, the satellite system may, via the feederlink earth station, collect the TV broadcasting signals as described herein but also may collect internet signals for transmission to the subscribers. For two-way communications for either TV broadcasting or broadband internet service, each subscriber communicates back to the system via a telephone or other terrestrial network, or through an earth station operating in a different band.

FIG. 6 depicts a geostationary satellite operating in the Broadcasting Satellite Service, BSS, providing service to the continental United States (CONUS). Also depicted is a feederlink earth station which receives its uplink signals from nearby TV broadcasters. Also shown in FIG. 6 is an internet network or "cloud" also connected to the feederlink earth station. The feederlink earth station transmits both kinds of signals via the satellite to a small antenna located on the subscriber's premises. Although the preferred embodiment of the present invention is in a BSS system, the present invention may be applied to other data or video/audio distribution systems. The system of the invention includes uplink feederlink earth stations, which transmit the TV signals to the satellite after aggregating them from the nearby TV broadcasting stations for transmission within a spot-beam. Each uplink feederlink earth station transmits to the satellite in the 17.3 to 17.8 GHz frequency band. The satellite or satellites provide the two or more spot-beam patterns, which are the subject of this invention. The uplink transmitters also are capable of transmitting many local data or programming packages to the satellite for re-transmission to subscribers. Thus, for example, an internet service could be provided by interfacing the uplink earth station with the internet. One local programming signal could be carried at one frequency and another local programming signal could be carried at another frequency or both sets of signals can be multiplexed together to form a single uplink carrier.

The satellite receives the uplink signal in a given spot-beam, filters and amplifies this signal and downconverts it to the transmitting frequency where further amplification and filtering is accomplished. The transmitter then transmits the signals back to the corresponding downlink spot-beam to be received by particular subscribers. The satellite receives signals in the frequency range of 17.3 to 17.8 GHz and transmits in the frequency range 12.2 to 12.7 GHz, however other frequency bands may be used. Each TV or data channel or sub-channel within the uplink signal is thus converted to an appropriate downlink TV or data channel or sub-channel. Spot-beam Patterns 1 and 2 may be generated by one or more antennas using one or more satellites, depending on the technology employed. While the description of the proposed invention is based on providing local-into-local service in the BSS, the proposed invention pertains to any spot-beam service involved in communicating signals to geographic areas within spot-beams, such as DMAs, municipalities, counties, provinces, states, nations, etc.

Spot-beams need not be uniform in size and the spot-beam pattern may be irregular, but the advantages of the Offset Pattern may still be achieved if the two spot-beam patterns have enough similarity in order to accomplish the advantages cited herein over the service area. In a preferred embodiment, all of the spot-beams of Pattern 1 and 2 are essentially the same (except for polarization and offset), i.e., the spot-beams are the same size and are arranged in the same orderly pattern.

EXAMPLES

The following examples and description are intended to show merely optional configurations for the devices of the invention. Variations, modifications, and additional attachments can be made by one of skill in the art. Thus, the scope of the invention is not limited to any specific example or any specific embodiment described herein. Furthermore, the claims are not limited to any particular embodiment shown or described here. Other embodiments and advantages of the invention are set forth in part in the description that follows, and in part, will be obvious from this description, or may be learned from the practice of the invention.

Multiple spot-beam patterns may be generated by phased arrays in which the signals delivered to the radiating elements of the antenna are controlled in phase and amplitude so as to generate the desired patterns. A single phased array antenna can provide Patterns 1 and 2. Reflector type antennas involving multiple feed horns also can generate the required spot beam pattern by the location of the feedhorns near the focus of the reflector. Two or more reflectors may be required to provide spot-beam Patterns 1 and 2.

Example 1

The inventor has studied a spot beam system serving the U.S. making use of conventional spot-beam technology, called the "Conventional Spot-Beam System" and an "Offset Spot-Beam System" of the invention. In the Conventional Spot-Beam system there were 48 co-axial spot-beams serving the continental United States (CONUS) on two polarizations (Patterns 1 and 2 are coaxial but orthogonally polarized). In the Offset Spot-Beam System of the invention, there were also 48 spot-beams serving CONUS on one polarization and 48 spot-beams serving CONUS on the orthogonal polarization but Pattern 2 was offset, as described herein; Pattern 2 was moved south by one half of a coverage beamwidth (as indicated in FIGS. 3 and 4). All 215 DMAs and approximately 1,600 TV channels are assigned to the individual spot-beams to avoid straddling to the maximum possible extent, and to promote diffusion in the saturated New York City spot-beam. The results of the two analyses, for a conventional spot-beam system and for the offset spot-beam system, are given below.

|  | Conventional Spot-Beam System | Offset Spot-Beam System |
| --- | --- | --- |
| Number of Original TV Signals | 1,707 | 1,707 |
| Actual TV Signals Transmitted | 2,794 | 1,972 |
| Number of Re-transmitted TV Signals | 1,087 | 265 |
| Saturated Beam Capacity, TV Channels | 91 | 57 |
| Number of Satellite Transponders | 310 | 208 |
| Satellite Transmitted Power, watts | 1,750 (estimated) | 1,174 |

A Nielsen Research report indicates that 1707 TV channels could be transmitted to satisfy the demand for TV in 215 DMAs; these exclude duplicated channels, such as two NBC Stations, in the same DMA. The Conventional Spot-Beam System required the transmission of 2,794 TV channels, or 1,087 duplicated TV channels in order to provide the service. The Offset Spot-Beam System required the transmission of only 1,972 total TV channels or only 265 duplicated TV channels, due almost entirely to the minimization of straddling.

Further, the Conventional Spot-Beam System resulted in a saturated spot-beam capacity (NY beam) of 91 TV channels while the Offset Spot-Beam System required only 57 TV channels (NY Beam). This gain was due to both the reduction in total TV channels transmitted due to the minimization of straddling and to the "diffusion" capability. In this analysis, DMAs which could have been served in the NY spot-beam (i.e., not straddled) were off-loaded into neighboring spot-beams for the sole purpose of reducing the capacity of the NY spot-beam. This means that the data rate per TV channel for the Offset Spot-Beam System can be higher by the ratio of 91/57, or 59.6%. Further, the number of required transponders and total transmitted power are reduced by 49%.

Thus, the implications to the satellite system by Offset Patterns are reduced spacecraft weight and power, directly translating into significant cost savings to the operators and to subscribers, and higher data rates for expanded services, such as high definition TV. The use of the Offset Patterns with multiple spot-beam satellites results in real and substantial benefits.

Example 2

A public safety activity involving recovery and search and rescue is normally conducted within state and county boundaries having stringent requirements for survivable two-way communications. A system of one or more multiple spot-beam satellites and simple uplink earth stations can provide the required survivable communications. Coverage of the counties and states could embody the Offset Patterns described herein to improve the communications efficiency by minimizing straddling and promoting diffusion. While counties and states are considered here, any mosaic of geographic areas might benefit from the invention.

One skilled in the art can devise and create numerous other examples according to this invention. Examples may also incorporate additional imaging, thermometry, and other elements known in the art. One skilled in the art is familiar with techniques and devices for incorporating the invention into a variety of devices and of designing improved devices through the use of the concepts presented here.

What is claimed:

1. A satellite comprising an arrangement of spot-beam antennas for covering a predetermined geographic area of interest within which geographic area there are multiple separate and distinguishable sub-areas, wherein the antennas produce at least two identical and orthogonal patterns of spot-beams on opposite polarizations, and the second pattern (Pattern 2) is offset with respect to the first pattern (Pattern 1) such that the amount of straddling between sub-areas covered by adjacent spot-beams arising from the Pattern 1 and Pattern 2 is substantially avoided, and wherein the antennas are arranged to direct spot-beams so that no parts within the predetermined geographic area of interest are not covered, and wherein each spot-beam is assigned a frequency band consistent with the amount of frequency re-use desired within a sub-area to be covered by the spot-beam and subject to the amount of acceptable self interference, and wherein each spot-beam is assigned a spectrum segment and the spectrum segment may be any fraction of the total available bandwidth of the arrangement of spot-beams.

2. The satellite of claim 1, wherein at least one spot-beam is different in size compared to the area covered by one other spot-beam.

3. The satellite of claim 1, wherein spot-beams directed to neighboring parts of the area of interest have different assigned frequency bands.

4. The satellite of claim 1, wherein the total bandwidth is B, the number of spot-beams is n, the frequency reuse factor is f, and the bandwidth generated by the arrangement of spot-beams is B/f×n.

5. A method of using a satellite of claim 1 to direct two spot-beam patterns on orthogonal polarizations to cover an area of interest, wherein Pattern 1 and Pattern 2 comprise substantially the same combination of spot-beam patterns and Pattern 2 is directed to an area that is shifted with respect to Pattern 1 by translation, rotation, or both.

6. The method of claim 5, wherein the coverage size of at least one spot-beam in Pattern 1 differs from the coverage size of at least one spot-beam in Pattern 2.

7. The method of claim 5, wherein Pattern 2 is rotated with respect to Pattern 1.

8. The method of claim 5, wherein Pattern 2 is shifted in one direct with respect to Pattern 1.

9. The method of claim 5, wherein Pattern 2 is both rotated and translated with respect to Pattern 1.

10. The method of claim 5, further comprising positioning Pattern 1 and Pattern 2 to cover a metropolitan area, district, municipality, county, state or nation or other mosaic of geographic areas.

11. The method of claim 10, wherein the area covered is a metropolitan area.

12. The method of any one of claims 5-10, wherein television signals are transmitted through the spot-beams.

13. The method of any one of claims 5-10, wherein communication signals are transmitted through the spot-beams.

14. The method of claim 5, further comprising locating an uplink earth station to communicate with the satellite where the boundaries of three to six spot-beams intersect.

15. A method for satellite TV broadcasting to cover the CONUS, wherein the method comprises
configuring one or more satellites to direct spot-beams to cover the CONUS with two identical and orthogonally polarized spot-beam Patterns, one off-set from the other, wherein the spot-beams of Pattern 1 illuminate the periphery of the spot-beams of Pattern 2 and vice versa such that the straddled geographic areas at the periphery of the spot-beams of Pattern 1 can be carried by the spot-beams of Pattern 2;
sending TV signals to one or more satellites; and
transmitting the TV signals over at least a part of the CONUS.

16. The method of claim 15, wherein Pattern 1 is rotated or translated, or both, with respect to Pattern 2.

* * * * *